United States Patent [19]

Kuroda et al.

[11] Patent Number: 4,748,196

[45] Date of Patent: May 31, 1988

[54] WATER REPELLENT COMPOSITION

[75] Inventors: Katsuhiko Kuroda; Toru Tagawa, both of Yokohama; Kiyoharu Yoshimi, Tokyo; Yasoji Ozawa, Machida, all of Japan

[73] Assignees: Mitsubishi Chemical Industries, Ltd.; Yoshino Gpysum Company, Ltd., both of Tokyo, Japan

[21] Appl. No.: 908,795

[22] Filed: Sep. 18, 1986

[30] Foreign Application Priority Data

| Sep. 25, 1985 | [JP] | Japan | 60-211293 |
| Oct. 3, 1985 | [JP] | Japan | 60-220909 |
| Oct. 3, 1985 | [JP] | Japan | 60-220910 |
| Oct. 4, 1985 | [JP] | Japan | 60-221163 |
| Apr. 21, 1986 | [JP] | Japan | 61-91666 |

[51] Int. Cl.$^4$ .............................................. C08L 1/26
[52] U.S. Cl. ........................................ 524/43; 524/45; 524/46; 524/60; 524/62; 524/66; 524/77; 524/275; 524/276; 524/277; 524/279; 524/489; 524/503; 524/517; 524/549
[58] Field of Search ............... 524/276, 277, 279, 489, 524/549, 503, 517, 43, 45, 46, 60, 62, 66, 77

[56] References Cited

U.S. PATENT DOCUMENTS

| 3,598,778 | 8/1971 | Burdick et al. | 524/549 |
| 4,407,999 | 10/1983 | Fushiki et al. | 524/276 |
| 4,613,646 | 9/1986 | Sandvick | 524/476 |

FOREIGN PATENT DOCUMENTS

| 35811 | 9/1978 | Japan . |
| 106609 | 8/1979 | Japan . |
| 58304 | 12/1983 | Japan . |
| 14932 | 1/1985 | Japan . |

*Primary Examiner*—Theodore E. Pertilla
*Attorney, Agent, or Firm*—Oblon, Fisher, Spivak, McClelland & Maier

[57] ABSTRACT

A water repellent composition comprising an emulsion prepared by emulsifying in water (A) a wax having a melting point of from 40° to 90° C. and (B) an olefin-maleic anhydride derivative in the presence of (C) a water-soluble alkaline compound and/or a nonionic emulsifier.

10 Claims, No Drawings

WATER REPELLENT COMPOSITION

The present invention relates to an emulsion-type water repellent composition whereby the applicability is improved without impairing the water repellency of a wax. More particularly, it relates to an emulsion-type water repellent composition which is excellent in the storage stability, the drying properties and the mechanical stability and which has a high level of water repellency.

Heretofore, it has been common to employ a paraffin wax, a petroleum resin, asphalt, a silicone resin or a fluorine resin as an agent for imparting water repellency. Among them, the paraffin wax is most commonly employed as a water repellent agent for e.g. building materials in view of the water repellency and the price. However, it has been required to use a considerable amount of a surfactant to emulsify the paraffin wax. If such a water repellent agent is used for various building materials, papers, organic or inorganic fibers, etc., the surfactant will remain in the materials and adversely affect the water repellency, whereby the expected effects can not sufficiently be obtained. It has been proposed to complement this drawback by using a surfactant capable of being readily decomposed by heat treatment, as the surfactant to be used in combination with the above water repellent agent. However, in general, such a surfactant has a high HLB, and if it remains even in a small amount in the treated papers, fibers, etc., the water repellency will thereby be deteriorated. Thus, there has been a problem that no adequate treating effects can be achieved.

As water repellent compositions to overcome the above problems, there have been proposed a composition wherein oxidized paraffin is incorporated (Japanese Examined Patent, Publication No. 35811/1978), a composition wherein a monoester of a styrene-maleic anhydride copolymer is incorporated (Japanese Examined Patent Publication No. 58304/1983), a composition wherein an alkali metal salt of a partially esterified product of a styrene-maleic anhydride copolymer is incorporated (Japanese Unexamined Patent Publication No. 106609/1979) and a composition wherein a saturated fatty acid adduct of an olefin is incorporated (Japanese Unexamined Patent Publication No. 14932/1985).

However, these water repellent compositions have problems such that no adequate water repellency is obtained unless a substantial amount is used, that the properties such as the storage stability, mechanical stability or drying properties are inadequate, that the costs of the starting materials are high, and that no adequate water repellency is obtainable depending upon the type of the substrate to be treated.

The present inventors have conducted extensive researches with an aim to solve the above-mentioned problems, and have finally arrived at this invention.

The present invention provides a water repellent composition comprising an emulsion prepared by emulsifying in water (A) a wax having a melting point of from 40° to 90° C. and (B) an olefin-maleic anhydride derivative in the presence of (C) a water-soluble alkaline compound and/or a nonionic emulsifier.

Now, the present invention will be described in detail with reference to the preferred embodiments.

The wax having a melting point of from 40° to 90° C. as a component of the water repellent composition of the present invention means a paraffinic or olefinic hydrocarbon. Specifically, the wax includes paraffin wax, montan wax and a low melting point polyolefin wax. If the melting point of the wax is lower than 40° C., the product which is treated by the water repellent agent is deteriorated in summer time, and if the melting point is higher than 90° C., it is difficult to obtain a product having excellent water repellency.

As the olefin-maleic anhydride derivative as another component, there may be employed an adduct of an α-olefin having from 4 to 6 carbon atoms or an olefin having from 4 to 60 carbon atoms and having a double bond at the α-position obtained by the oligomerization of an α-olefin having from 2 to 5 carbon atoms such as ethylene, propylene, isobutylene or isoamylene, with maleic anhydride; a copolymer having a molecular weight of 200 to 3000 obtained by copolymerizing such an α-olefin with maleic anhydride by a radical initiator; or a partially esterified product thereof with an organic monohydroxy compound. The organic monohydroxy compound used for the formation of the partially esterified product includes an alcohol such as methanol, ethanol, isopropanol, butanol or 2-ethylhexanol; a cellosolve such as butyl cellosolve or ethyl cellosolve; a long chain alkyl alcohol such as stearyl alcohol or oleyl alcohol; an aryl alcohol such as nonylphenol, dodecylphenol or styrene-modififed phenol; and an adduct of ethylene oxide with the above-mentioned long chain alkyl alcohol, an aryl alcohol or an alkylamide such as stearylamide or oleylamide or a polypropylene glycol having a molecular weight of from 1000 to 10,000. Such an organic monohydroxy compound is used in an amount of not more than 1 mol relative to 1 mol of maleic anhydride. The preparation of the partially esterified product may be conducted after the reaction of the olefin with maleic anhydride, or by the reaction of a partially esterified product of maleic anhydride with an olefin. The molar ratio of the olefin to the maleic anhydride or its partially esterified product is preferably within the range of from 3:1 to 1:2. If the molar ratio is outside this range, the stability of the emulsion, or the water repellency depending upon the substrate to be treated therewith, may be impaired, such being undesirable. The reaction of the organic monohydroxy compound with maleic anhydride or with an olefin-maleic anhydric derivative is conducted under atmospheric pressure or if necessary, under a pressure in an autoclave, at a temperature of from 90° to 130° C. for 1 to 20 hours.

The water repellency of the water repellent composition of the present invention can be improved by using a hydrocarbon resin in combination with the above-mentioned wax and the olefin-maleic anhydride derivative. Such a hydrocarbon resin includes a petroleum resin having a molecular weight of 500 to 2000 obtained by polymerizing, by means of Friedel-Crafts catalyst, an aromatic hydrocarbon fraction having 9 carbon atoms or an aliphatic hydrocarbon fraction having 5 carbon atoms obtainable from a petroleum refinary or from a process of petroleum chemical industry; a coumarone-indene resin having a molecular weight of from 500 to 2000 obtained by a similar polymerization using a naphtha obtained from tar as the starting material; a terpene resin having a molecular weight of from 500 to 2000 obtained from terpene oil; rosin; oligomers of ethylene, propylene, butene, isobutene or styrene, having a molecular weight of from 500 to 2000 and a melting point of at least 95° C.; and asphalts.

The hydrocarbon resin is used preferably in an amount of from 0 to 2.0 parts by weight relative to 1 part by weight of the wax. If the hydrocarbon resin is too much, the cost will increase and the water repellency is likely to be impaired.

The weight ratio of the wax or a mixture of the wax and the hydrocarbon resin to the olefin-maleic anhydride derivative is selected usually within a range of from 1:0.01 to 1:0.7, preferably from 1:0.02 to 1:0.4.

Specific examples of the water-soluble alkaline compound to be used for the emulsification include an alkali metal hydroxide such as lithium hydroxide, sodium hydroxide or potassium hydroxide; an alkali metal carbonate such as sodium carbonate or potassium carbonate; ammonia; ammonium hydroxide; an amine such as dimethylamine, trimethylamine or triethylamine; and an ethanolamine such as triethanolamine, diethanolamine, dimethylethanolamine or methyldiethanolamine. The amount of such an alkaline compound is usually within a range of from 0.3 to 2 times the amount required for the neutralization of the olefin-maleic anhydride derivative. If the amount is outside this range, the stability of the emulsion is likely to be impaired, such being undesirable.

Specific examples of the nonionic emulsifier include an adduct of ethylene oxide with a long chain alkyl alcohol such as stearyl alcohol or oleyl alcohol, an aryl alcohol such as nonylphenol, dodecylphenol or styrene-modified phenol, an alkylamine such as beef tallow amine, oleylamine, stearylamine, soybean amine or coconut oil amine, an alkylamide such as stearylamide or oleylamide, or a polypropylene glycol having a molecular weight of from 1000 to 10,000, or a sulfonate of such an adduct, wherein the amount of the ethylene oxide added (hereinafter referred to simply as "EO addition amount") is at least 35 mols. If the EO addition amount is less than 35 mols, the physical properties of the emulsion will not adequately be improved.

Further, a partial ester of a styrene-maleic anhydride copolymer or of a maleinated petroleum resin, obtained by reacting the copolymer or the resin with the above-mentioned ethylene oxide adduct, may also be employed as the nonionic emulsifier. In this case, the EO addition amount is required to be within a range of from 20 to 50 mols. If the EO addition amount is outside this range, the physical properties of the emulsion will not be adequately improved, or the water repellency tends to deteriorate.

Further, a partial ester of a styrene-maleic anhydride copolymer or of a maleinated petroleum resin, obtained by reacting the copolymer or the resin with the above-mentioned alkyl alcohol or aryl alcohol and the above-mentioned ethylene oxide adduct, may also be employed as the nonionic emulsifier. In this case, the EO addition amount is preferably within a range of from 20 to 80 mols.

The above-mentioned partial ester of the styrene-maleic anhydride copolymer or the maleinated petroleum resin, may be prepared by mixing the copolymer or the resin with the above-mentioned ethylene oxide adduct and the above-mentioned alkyl alcohol or aryl alcohol, and heating the mixture under stirring.

The ethylene oxide adduct and the alkyl alcohol or aryl alcohol may be mixed separately or simultaneously. The molar ratio of the ethylene oxide adduct to the alkyl alcohol or aryl alcohol is selected usually within a range of from 0.75:0.25 to 0.25:0.75, preferably from 0.6:0.4 to 0.4:0.6.

The total amount of the ethylene oxide adduct and the alkyl alcohol or aryl alcohol is selected usually from 0.5 to 1.5 mols, preferably from 0.6 to 1.2 mols, relative to 1 mol of the maleic anhydride groups in the styrene-maleic anhydride copolymer or in the maleinated petroleum resin.

The amount of the nonionic emulsifier is preferably within a range of from 0.01 to 0.5 part by weigh relative to 1 part by weight of the total amount of the wax or a mixture of the wax and the hydrocarbon resin and the olefin-maleic anhydride derivative. If the amount of the nonionic emulsifier is less than the above range, the drying properties of the emulsion and the mechanical stability will not be adequately improved, and if the amount exceeds the above range, there will be an adverse effect to the water repellency-imparting properties, such being undesirable.

The nonionic emulsifier may be added to a composition obtained by heating and melting the wax or a mixture of the wax and the hydrocarbon resin together with maleic anhydride, or it may preliminarily be heated and melted together with the olefin-maleic anhydride derivative, and then added to the wax or a mixture of the wax and the hydrocarbon resin. Otherwise, these materials may be added separately in water.

Further, in order to improve the storage stability of the emulsion, it is preferred to incorporate a protective colloid. As the protective colloid, a water soluble polymeric compound such as polyvinyl alcohol, polyacrylamide, methyl cellulose, carboxymethyl cellulose or hydroxypropyl cellulose, may be mentioned. Particularly preferred is a polyvinyl alcohol having a saponification degree of at least 70% The polyvinyl alcohol is used usually in an amount such that the weight ratio of the total amount of the wax or a mixture of the wax and hydrocarbon resin and the olefin-maleic anhydride derivative to the polyvinyl alcohol is within a range of from 1:0.01 to 1:0.4. The polyvinyl alcohol may be added after the formation of the emulsion, or may be added at the time of the emulsification.

The water repellent composition of the present invention is prepared by emulsifying in water the above-mentioned wax and the olefin-maleic anhydride derivative, and in some cases a hydrocarbon resin, in the presence of a water-soluble alkaline compound and/or a nonionic emulsifier. Two methods i.e. a mechanical emulsification method and a phase inversion emulsification method, may be mentioned for the emulsification. These methods may be used alone or in combination. The mechanical emulsification method may be conducted by a homomixer, a valve homgenizer, a colloid mill or a supersonic emulsification. Any method may be employed so far as a uniform emulsion is thereby obtainable.

The water repellent composition of the present invention is useful not only as an agent for imparting water repellency to gypsum, cement, paper, wooden boards or fibers, but also widely as a coagulation-preventing agent for fertilizers, as a spreader for agricultural chemicals or as a soil improver. Further, it is also possible to optimize the applicability by using it in combination with various polymer emulsions depending upon the particular application. Further, there is no particular restriction as to the use of various additives during the above-mentioned applications.

Now, the present invention will be described in further detail with reference to Examples, Comparative Example and Preparation Examples. However, it should be understood that the present invention is by no means restricted by these specific Examples.

In the Examples, "parts" and "%" mean "parts by weight" and "% by weight", respectively.

[I] PREPARATION OF α-OLEFIN-MALEIC ANHYDRIDE DERIVITIVES

PREPARATION EXAMPLE 1

Into a flask, 1200 g of α-olefins having from 30 to 60 carbon atoms (an average carbon number: 48; Dialene 30, tradename, manufactured by Mitsubishi Chemical Industries Ltd.) were charged, and the interior of the system was adequately flushed with nitrogen gas. Then, the system was heated to 185° C., and 180 g of maleic anhydride and 45.5 g of di-t-butylperoxide were simultaneously supplied thereto under stirring over a period of 2 hours for polymerization. The reaction mixture was aged for further 1 hour, then cooled to obtain an olefin-maleic anhydride copolymer (copolymer A) having a maleic anhydride content of 0.725 mmol/g.

PREPARATION EXAMPLE 2

Into a flask, 560 g of an olefin having 8 carbon atoms (diisobutylene) and 196 g of maleic anhydride were charged, and the interior of the system was adequately flushed with nitrogen gas. Then, the system was heated to a temperature of from 80° to 100° C., and 73.3 g of t-butyl peroctoate was supplied thereto under stirring over a period of 2 hours for polymerization. The mixture was aged for further 1 hour, and then cooled and filtered. The polymer thus obtained was dried to obtain an olefin-maleic anhydride copolymer (copolymer B) having a maleic anhydride content of 2.6 mmol/g.

PREPARATION EXAMPLE 3

Into an autoclave, 420 g of an α-olefin having 6 carbon atoms (Dialene 6, tradename, manufactured by Mitsubishi Chemical Industries Ltd.) and 196 g of maleic anhydride were charged, and an olefin-maleic anhydride copolymer was obtained in the same manner as in Preparation Example 2. To this copolymer, 96 g of methanol was added, and the mixture was reacted at 60° C. for 3 hours to obtain a partially esterified olefin-maleic anhydride copolymer (copolymer C) having a maleic anhydride content of 2.25 mmol/g.

PREPARATION EXAMPLE 4

Into an autoclave, 484 g of an olefin having 12 carbon atoms (main component: 2,4,6-trimethyl-l-nonene) and 311 g of maleic anhydride were charged, and the interior of the system was adequately flushed with nitrogen gas. The system was heated to 200° C. under stirring, and reacted at the same temperature for 8 hours. Then, while gradually reducing the pressure, unreacted olefin and maleic anhydride were distilled off to obtain an olefin-maleic anhydride adduct (adduct D) having a maleic anhydride content of 1.34 mmol/g.

PREPARATION EXAMPLE 5

120 g of the copolymer A of the Preparation Example 1 and 195 g of stearyl alcohol were heated under stirring at 100° C. for 6 hours to obtain a partially esterified olefin-maleic anhydride copolymer (copolymer E).

PREPARATION EXAMPLE 6

Into a flask, 1200 g of the same α-olefin as used in Preparation Example 1 and 311 g of maleic anhydride were charged, and the interior of the system was adequately flushed with nitrogen gas. Then, the system was heated to 200° C. under stirring, and reacted at the same temperature for 8 hours. Then, unreacted maleic anhydride was distilled off while gradually reducing the pressure, whereby an adduct of an α-olefin with maleic anhydride (adduct F) having a maleic anhydride content of 134 mmol/g, was obtained.

[II] PREPARATION OF NONIONIC EMULSIFIERS

PREPARATION EXAMPLE 7

50 g of a styrene-maleic anhydride copolymer (molecular weight: 1600, acid value: 480) and 621 g of an ethylene oxide adduct of nonylphenol (EO addition amount: about 28 mols) were heated at a temperature of 100° C. for 6 hours to obtain a partial ester of the nonylphenyl ethylene oxide adduct of the styrene-maleic anhydride copolymer (emulsifier A).

PREPARATION EXAMPLE 8

Emulsifier B was obtained in the same manner as in Preparation Example 7 except that 452 g of an ethylene oxide adduct of nonylphenol having an EO addition amount of 19 mols was used instead of the ethylene oxide adduct of nonylphenol in Prepartion Example 7.

PREPARATION EXAMPLE 9

Emulsifier C was obtained in the same manner as in Preparation Example 7 except that 1395 g of an ethylene oxide adduct of nonylphenol having an EO addition amount of 70 mols was used instead of the ethylene oxide adduct of nonylphenol in Preparation Example 7.

PREPARATION EXAMPLE 10

50 g of the same styrene-maleic anhydride copolymer as used in Preparation Example 7, 492 g of an ethylene oxide adduct of nonylphenol (EO addition amount: about 47 mols) and 58 g of stearyl alcohol were heated under stirring in the same manner as in Preparation Example 7, whereby a partial ester of the styrene-maleic anhydride copolymer (emulsifier D) was obtained.

EXAMPLE 1

95 parts of a paraffin wax having a melting point of 68.3° C., 5 parts of copolymer A and 122.2 parts of warm water, were heated and melted at 85° C. After an addition of 0.4 part of potassium hydroxide thereto, the mixture was emulsified by a homomixer. The product was further subjected to a piston-type high pressure homogenizer and homogenized under a pressure of 250 kg/cm$^2$, and then cooled to obtain paraffin emulsion A having a solid content of 45%.

EXAMPLE 2

Paraffin emulsion B was obtained in the same manner as in Example 1 except that copolymer B was used and 1.5 parts of potassium hydroxide was employed.

EXAMPLE 3

Paraffin emulsion C was obtained in the same manner as in Example 1 except that copolymer C was used and 0.6 part of potassium hydroxide was used.

EXAMPLE 4

Paraffin emulsion D was obtained in the same manner as in Example 1 except that adduct D was used and 0.75 part of potassium hydroxide was used.

EXAMPLE 5

76 parts of a paraffin having a melting point of 68.3° C., 5 parts of a petroleum resin having a melting point of 97° C. and a bromine value of 31.2 and 5 parts of copolymer B, were melted at 120° C. The temperature of the system was then cooled to 98° C., and 122.2 parts of warm water having the same temperature and 1.5 parts of potassium hydroxide, were added. Then, the operation was conducted in the same manner as in Example 1 to obtain paraffin emulsion E.

EXAMPLE 6

96 parts of a paraffin wax having a melting point of 52.7° C. and 2 parts of copolymer A, were heated and melted at 85° C., and 0.08 part of potassium hydroxide and 3 parts, as solid content, of polyvinyl alcohol (20% solution) having a saponification degree of about 97% and a viscosity of the 4% aqueous solution being 5.3 centipoise at 25° C., were added thereto. Further, 114.2 parts of warm water was added, and the mixture was emulsified by a homomixer. The emulsified mixture was further subjected to a piston-type high pressure homogenizer and homogenized under a pressure of 250 kg/cm$^2$, and then cooled to obtain paraffin emulsion F having a solid content of 45%.

EXAMPLE 7

96 parts of a paraffin wax having a melting point of 52.7° C., 2 parts of a petroleum resin having a melting point of 97° C. and a bromine value of 31.2 and 2 parts of copolymer A, were melted at 120° C. Then, the temperature of the system was lowered to 98° C., and 114.2 parts of warm water having the same temperature, 2 parts, as solid content, of the same polyvinyl alcohol (20% aqueous solution) as used in Example 6 and 0.08 part of potassium hydroxide, were added thereto. The mixture was emulsified by a homomixer. The emulsified mixture was further subjected to a piston-type high pressure homogenizer and homogenized under a pressure of 250 kg/cm$^2$, and then cooled to obtain paraffin emulsion G having a solid content of 45%.

EXAMPLE 8

Paraffin emulsion H having a solid content of 45% was obtained in the same manner as in Example 6 except that 5 parts of copolymer A and 0.2 part of potassium hydroxide were used in Example 6 and no polyvinyl alcohol was used.

EXAMPLE 9

Paraffin emulsion I having a solid content of 45% was obtained in the same manner as in Example 7 except that 4 parts of copolymer A and 0.16 part of potassium hydroxide were used in Example 7 and no polyvinyl alcohol was used.

EXAMPLE 10

76 parts of a paraffin wax having a melting point of 68.3° C. and 19 parts of a petroleum resin having a melting point of 97° C. and a bromine value of 31.2 were melted at 120° C. Then, the temperature of the system was lowered to 98° C., and 5 parts of copolymer B, 122.2 parts of warm water of 98° C. and 1.5 parts of potassium hydroxide, were added thereto. Then, the operation was conducted in the same manner as in Example 1 to obtain paraffin emulsion J.

EXAMPLE 6

76.4 parts of a paraffin wax having a melting point of 68.3° C. and 19.1 parts of a petroleum resin having a melting point of 97° C. and a bromine value of 31.2, were melting at 120° C. The temperature of the system was lowered to 98° C., and 1.94 parts of coploymer B, 122 parts of warm water of 98° C., 0.52 part of potassium hydroxide and 2.5 parts, as solid content, of a polyvinyl alcohol (10% aqueous solution) having a saponification degree of 97% and a viscosity of the 4% aqueous solution being 5 at 25° C., were added thereto. The operation was conducted in the same manner as in Example 1 to obtain paraffin emulsion K.

EXAMPLE 12

To paraffin emulsion C obtained in Example 3, the same polyvinyl alcohol (20% aqueous solution) as used in Example 11 was added in a weight ratio of 0.2 to the total of the paraffin wax and copolymer C in the emulsion to obtain paraffin emulsion L having a solid content of about 37%.

EXAMPLE 13

96 parts of a paraffin wax having a melting point of 52.7° C., 4.5 parts of copolymer A and 1.4 parts of an ethylene oxide adduct of nonylphenol (EO addition amount: 47 mols), were heated and melted at 90° C. to obtain a uniform melt. Then, 122.2 parts of warm water and 1.0 part of methyldiethanolamine were added thereto, and the mixture was emulsified by a homomixer. The emulsified mixture was further subjected to a piston-type high pressure homogenizer and homogenized under a pressure of 250 kg/cm$^2$, and then cooled to obtain paraffin emulsion M having a solid content of 45%.

EXAMPLE 14

96 parts of a paraffin wax having a melting point of 52.7° C., 4.0 parts of copolymer A and 2.0 parts of an ethylene oxide adduct of beef tallow amide (EO addition amount: 50 mols), were heated and melted at 85° C. to obtain a uniform melt. Then, 122.2 parts of warm water and 0.9 part of methyldiethanolamine were added thereto, and the operation was conducted in the same manner as in Example 13 to obtain paraffin emulsion N having a solid content of 45%.

EXAMPLE 15

Paraffin emulsion O having a solid content of 45% was obtained in the same manner as in Example 14 except that 2.0 parts of emulsifier A was used instead of the ethylene oxide adduct of beef tallow amide in Example 14.

EXAMPLE 16

1.2 parts of copolymer A and 2.8 parts of an ethylene oxide adduct of nonylphenol (EO addition amount: 47 mols) were heated and melted at 90° C. to obtain a uniform melt. Then, 96 parts of a paraffin having a melting point of 52.7° C. was added thereto and melted. Then, 122.2 parts of warm water and 0.5 part of N,N-dimethylethanolamine were added thereto, and the operation was conducted in the same manner as in Example 13 to obtain paraffin emulsion P having a solid content of 45%.

EXAMPLE 17

Paraffin emulsion Q having a solid content of 45% was obtained in the same manner as in Example 13 except that 1.0 part of adduct F was used instead of copolymer A in Example 13, and 3.0 parts of an ethylene oxide adduct of nonylphenol (EO addition amount: 47 mols) was used.

EXAMPLE 18

96 parts of a paraffin wax having a melting point of 52.7° C., 4.0 parts of copolymer A and 2.0 parts of emulsifier D were heated and melted at 85° C. Then, 122.2 parts of warm water and 1.0 parts of methyldiethanolamine were added thereto, and the subsequent operation was conducted in the same manner as in Example 13 to obtain paraffin emulsion R having a solid content of 45%.

EXAMPLE 19

Paraffin emulsion S having a solid content of 45% was obtained in the same manner as in Example 18 except that copolymer E was used instead of copolymer A in Example 18 and 0.5 part of methyldiethanolamine was used.

EXAMPLE 20

96 parts of a paraffin wax having a melting point of 52.7° C., 1.0 part of a petroleum resin having a melting point of 97° C. and a bromine value of 31.2, 3.0 parts of copolymer E and 2.0 parts of emulsifier D, were heated and melted at 85° C. Then, 122.2 parts of warm water and 0.5 part of dimethylethanolamine were added thereto, and the operation was conducted in the same manner as in Example 18 to obtain paraffin emulsion T having a solid content of 45%.

COMPARATIVE EXAMPLE 1

Paraffin emulsion U having a solid content of 45% was obtained in the same manner as in Example 15 except that emulsifier B was used instead of emulsifier A in Example 15.

COMPARATIVE EXAMPLE 2

Paraffin emulsion V having a solid content of 45% was obtained in the same manner as in Example 15 except that emulsifier C was used instead of emulsifier A in Example 15.

COMPARATIVE EXAMPLE 3

Paraffin emulsion W having a solid content of 45% was obtained in the same manner as in Example 16 except 1.6 parts of copolymer A and 2.4 parts of an ethylene oxide adduct of nonylphenol (EO addition amount: 28 mols) were used in Example 16.

COMPARATIVE EXAMPLE 4

In accordance with Example 1 of Japanese Unexamined Patent Publication No. 14932/1975, emulsion X was prepared in the same manner as in the Example with the following formulation.

| | |
|---|---|
| Paraffin having a melting point of 130° F. | 49.5 parts |
| Butyric acid adduct of $C_{20}$-$C_{28}$ α-olefin (Dialene 208, trade name, manufactured by Mitsubishi Chemical Industries Ltd.) | 0.5 part |
| (mp: 47° C., acid value: 61) | |
| Potassium hydroxide | 0.03 part (neutralization equivalent) |
| Warm water | 50 parts |

COMPARATIVE EXAMPLE 5

In accordance with Example 4 of Japanese Examined Patent Publication No. 58304/1983, emulsion Y was obtained in the same manner as in the Example with the following formulation.

| | |
|---|---|
| Petroleum resin having a softening point of 120° C. and a bromine value of 30 | 71 parts |
| Paraffin having a melting point of 145° F. | 259 parts |
| Aluminum stearate | 40 parts |
| 6% Aqueous solution of potassium salt of monomethyl ester of a styrene-maleic anhydride copolymer | 678 parts |

COMPARATIVE EXAMPLE 6

In accordance with the method disclosed in Japanese Unexamined Patent Publication No. 37423/1980, 95 parts of a paraffin having a melting point of 60° C. and 5 parts of maleic anhydride-modified wax having an acid value of 65 and a softening point of 111° C., were melted at 1130° C. Then, 122.2 parts of warm water and 0.3 part of potassium hydroxide were added thereto in a pressure container, and the mixture was emulsified and treated at the same temperature as in Example 1 to obtain emulsion Z.

TEST EXAMPLES 1 to 5 and COMPARATIVE TEST EXAMPLES 1 and 2

An non-sized paper having a weight of 123 g/m² was dipped for 1 minute in a bath containing 1%, as solid content, of paraffin emulsion A-E, X or Y, and then sqeezed by rollers, whereby the pick-up amount was measured. Then, it was pressed at 120° C. for from 2 to 3 minutes, and the water resistance (stockigt sizing degree) was measured in accordance with JIS (Japanese Industrial Standard) P-8122. The results are shown in Table 1.

TABLE 1

| | Paraffin emulsion | Pick-up amount (g/m²) | Water repellency (stockigt/sec) |
|---|---|---|---|
| Test Examples | | | |
| 1 | A | 2.2 | 172 |
| 2 | B | 2.3 | 183 |
| 3 | C | 2.5 | 161 |
| 4 | D | 2.4 | 154 |
| 5 | E | 2.5 | 142 |
| Comparative Test Examples | | | |
| 1 | X | 2.5 | 96 |
| 2 | Y | 2.5 | 125 |

TEST EXAMPLES 6 to 9

Four parts, as solid content, of paraffin emulsion F, G, H or I was added to 100 parts of a urea resin (Suisobond S630-5, manufactured by Nippon Kasei K.K., nonvolatile content: 65%), and 0.7 part of ammonium chloride was added as a curing agent thereto to obtain a glue for a particle board. The glue thus obtained was sprayed to coniferous wood chips separately for the surface layer and for the core layer. The chips were then subjected to forming and heat-pressed at 155° C. under a pressure of 150 kg/cm² for 1 minute and under a pressure of 70 kg/cm² for 5 minutes to obtain a three layered particle board (specific gravity=0.7) having a thickness of 15 mm.

For the surface layers, the glue was diluted with water so that the urea resin concentration in the mixture became 45%, and for the core layer, the glue was used by itself (urea resin concentration: about 52%).

The water absorption and the thickness swell in accordance with JIS A-5908 were measured after immersing the particle board thus obtained in water of 25° C. for 2 and 24 hours.

$$\text{Water absorption (\%)} = \frac{\text{(Weight after immersion } - \text{ Weight before immersion)}}{\text{Weight before immersion}} \times 100$$

$$\text{Thickness swell (\%)} = \frac{\text{(Thickness after immersion } - \text{ Thickness before immersion)}}{\text{Thickness before immersion}} \times 100$$

The results are shown in a Table 2.

TABLE 2

| Test Examples | Paraffin emulsions | Water absorption (%) 2 hrs | 24 hrs | Thickness swell (%) 2 hrs | 24 hrs |
|---|---|---|---|---|---|
| 6 | F | 9.3 | 30.3 | 0.9 | 6.1 |
| 7 | G | 8.9 | 29.2 | 0.9 | 5.9 |
| 8 | H | 12.5 | 37.6 | 1.3 | 8.5 |
| 9 | I | 10.4 | 36.1 | 1.0 | 7.2 |

TEST EXAMPLES 10 to 14 and COMPARATIVE TEST EXAMPLES 3 and 4

To 100 parts of β-gypsum hemihydrate (Sakurajirushi Grade A, manufactured by Yoshino Gypsum Co. Ltd.), 1.0 part, as solid content, of paraffin emulsion A, B, C, L, D, X or Z and 80 parts of water were added to obtain a slurry. The slurry was poured in a space between a pair of sheets for a gypsum board, and the gypsum board thus formed was dried at 70° C. for about 2.5 hours.

The water absorption was measured after immersing the board in water of 20° C.±1 C. for 24 hours.

The results are shown in Table 3.

TABLE 3

| | Paraffin emulsion | Water absorption (%, 20° C. × 24 hrs) | Stability in saturated gypsum solution |
|---|---|---|---|
| Test Examples | | | |
| 10 | A | 17.2 | O |
| 11 | B | 10.6 | O |
| 12 | C | 15.0 | O |
| 13 | L | 10.6 | O |
| 14 | D | 9.2 | O |
| Comparative Test Examples | | | |
| 3 | X | 19.3 | Δ |
| 4 | Z | 38.2 | Δ |

TEST EXAMPLES 15 and 16 and COMPARATIVE TEST EXAMPLE 5

To 100 parts of β-gypsum hemihydrate (Sakurajirushi Grade A, manufactured by Yoshino Gypsum Co., Ltd.), 1.0 part, as solid content, of paraffin emulsion J, K or Y was added, and 2 parts of gypsum dihydrate as a hydration accelerator, 80 parts of water and from 0.01 to 0.02% of a foaming agent so as to bring the specific gravity of the resulting gypsum board to a level of from about 0.75 to about 0.8, were further added. Then, a gypsum board was obtained in the same manner as in Test Examples 10 to 14.

With respect to this board, the water absorption after immersion for 2 hours was measured in the same manner as in Test Examples 10 to 14. The results are shown in Table 4.

Further, to examine the fluidity of the gypsum, a slurry obtained by adding 1.5 parts, as solid content, of an emulsion and 80 parts of water to 100 parts of the above gypsum, was immediately poured into a bottomless truncated cone-shaped container (internal diameter at the bottom: 50 mm, internal diameter at the top: 35 mm, height: 30 mm) placed on a glass plate; an excess slurry above the top of the container was scraped off with a metal spatula; and then the container was removed by pulling it gradually vertically upwardly, whereupon the maximum diameter of the gypsum slurry spread on the glass plate was measured and taken as a flow value. The results are shown in Table 4.

TABLE 4

| | Paraffin emulsion | Water absorption (%, 20° C. × 2 hrs) | Stability in saturated gypsum solution | Flow value (cm) |
|---|---|---|---|---|
| Test Examples | | | | |
| 13 | J | 7.2 | O | 15.4 |
| 16 | K | 6.9 | O | 15.3 |
| Comparative Test Examples | | | | |
| 5 | Y | 7.8 | Δ | 14.1 |

Gypsums used for the preparation of gypsum boards in Japan include many gypsums which make the slurry acidic, such as by product gypsum from stack gas rubbing and that from the production of phosphoric acid. For the examination of the stability of the water repellent composition against such gypsums, one drop of each paraffin emulsion was dropped into a saturated gypsum aqueous solution of pH 5, whereupon the stability was visually observed, and evaluated by the following standards:

O: Uniformly dispersed
Δ: Dispersed but aggregates formed
The results are shown in Tables 3 and 4.

TEST EXAMPLES 17 to 24 and COMPARATIVE TEST EXAMPLES 6 to 9

About 0.03 ml of each of paraffin emulsions M to X, was put on a finger tip and rubbed, whereupon the number of times of the rubbing operations until the emulsion broke was taken as a drying property as shown in Table 5. The greater the number of times, the better the drying property.

Then, 80 g of each of paraffin emulsions M to X was sampled and left to stand in a constant temperature chamber at 20° C. overnight. Then, by using a tester for measuring the mechanical stability of a natural rubber latex in accordance with JIS K-6381, a test disk was rotated at 20° C. at 14,000 rpm, whereby the time until the emulsion broke was taken as the mechanical stability. For a sample which was stable upon expiration of 7 minutes, the measurement was discontinued at the expiration of 7 minutes. The results are shown in Table 5.

Particle boards were prepared in the same manner as in Test Examples 6 to 9 by using paraffin emulsions M to X, and the water absorption and the thickness swell, were measured in the same manner. The results are shown in Table 5.

TABLE 5

| Paraffin emulsion | Drying property (times) | Mechanical stability (sec) | Water absorption (%) | Thickness swell (%) |
|---|---|---|---|---|
| Test Examples | | | | |
| M | 20 | 420 or more | 45.6 | 11.9 |
| N | 14 | " | 45.8 | 11.7 |
| O | 18 | " | 45.3 | 11.4 |
| P | 20 or more | " | 44.8 | 12.0 |
| Q | " | " | 47.6 | 11.6 |
| R | 12 | 320 | 42.4 | 10.8 |
| S | 14 | 400 | 45.2 | 11.2 |
| T | 12 | 350 | 44.3 | 11.0 |
| Comparative Test Examples | | | | |
| U | 10 | 420 or more | 52.0 | 15.8 |
| V | 11 | " | 49.4 | 13.9 |
| W | 10 | " | 48.3 | 13.2 |
| X | 4 | 60 | 55.3 | 15.9 |

We claim:

1. A water repellent composition comrpising an emulsion prepared by emulsifying in water (A) a wax having a melting point offrom 40° to 90° C. and (B) at least one member selected fromthe group consisting of an adduct or copolymer of an α-olefin having from 4 to 60 carbon atoms with maleic anhydride, and a partially esterified product thereof, with the weight ration of (A) to (B) being from 1:0.001 to 1:0.7, in the presence of (C) a water-soluble alkaline compound.

2. The water repellent composition according to claim 1, which further contains (C') a nonionic emulsifier.

3. The water repellent composition according to claim 1 or 2, which further contains (D) a hydrocarbon resin.

4. The water repellent composition according to claim 1 or 2, which further contains (E) a protective colloid.

5. The water repellent composition according to claim 2, wherein the nonionic emulsifier is an adduct of ethylene oxide with an alkyl alcohol, an aryl alcohol, an alkyl amine, an alkyl amide or polypropylene glycol, or a sulfonate thereof, the amount of ethylene oxide added being at least 35 mols.

6. The water repellent composition according to claim 2, wherein the nonionic emulsifier is a partial ester of a styrene-maleic anhydride copolymer or of a maleinated petroleum resin, obtained by reacting he copolymer or the resin with an adduct of ethylene oxide with an alkyl alcohol, an aryl alcohol, an alkyl amine, an alkyl amide or polyproylene glycol, the amount of ethylen oxide added being from 20 to 50 mols.

7. The water repellent composition according to claim 2, wherein the nonionic emulsifier is a partial ester of a styrene-maleic anhydride copolymer or of a maleinated petroleum resin, obtained by reacting the copolymer or the resin with an adduct of ethylene oxide with an alkyl alcohol, an aryl alcohol, an alkyl amine, an alkyl amide or polyproplene glycol, and an alkyl alcohol or an aryl alcohol.

8. The water repellent composition according to claim 3, wherein the hydrocarbon resin is a petroleum resin, a coumarone-indene resin, a terpene resin, rosin, a low moleclar weight polyolefin or asphalt.

9. The water repellent composition according to claim 4, wherein the protective colloid is polyvinyl alchol, polyacrylamide, methyl celulose, carboxymethyl cellulose or hydeoxypropyl cellulose.

10. The water repellent composition according to claim 4, wherein the protective colloid is polyvinyl alcohol.

* * * * *